US006573339B1

(12) United States Patent
Stieber et al.

(10) Patent No.: US 6,573,339 B1
(45) Date of Patent: Jun. 3, 2003

(54) IN SITU PREPARATION OF BIS-(BENZOTHIAZOLESULFEN)AMIDE IN A POLYMERIC MATRIX

(75) Inventors: Joseph F. Stieber, Prospect, CT (US); Robert J. Cornell, Prospect, CT (US); John M. Wefer, Newtown, CT (US); David Hajdasz, Meriden, CT (US); Jeffrey Otis, Middletown, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/228,297

(22) Filed: Jan. 12, 1999

(51) Int. Cl.[7] ............................ C08C 19/22; C08C 19/20
(52) U.S. Cl. ............................ 525/386; 525/374
(58) Field of Search ............................ 525/386, 374

(56) References Cited

U.S. PATENT DOCUMENTS

| | | | |
|---|---|---|---|
| 1,544,687 A | 7/1925 | Sebrell et al. | |
| 2,321,305 A | 6/1943 | Messer | 260/788 |
| 3,875,177 A | 4/1975 | Malson | 260/306.6 |
| 3,917,551 A * | 11/1975 | Jurrens et al. | 524/311 |
| 3,928,297 A * | 12/1975 | Thaler et al. | 260/79.5 |
| 4,148,769 A * | 4/1979 | Swarts et al. | 260/23.7 |
| 4,410,656 A * | 10/1983 | Coran et al. | 524/529 |
| 4,433,077 A * | 2/1984 | Callander | 523/344 |
| 4,490,447 A * | 12/1984 | Battersby | 429/143 |
| 4,499,243 A * | 2/1985 | Rader | 525/333.1 |
| 4,625,005 A * | 11/1986 | Miyabayashi et al. | 525/208 |
| 4,764,562 A * | 8/1988 | Tojo et al. | 521/55 |
| 4,803,250 A * | 2/1989 | Nagasaki et al. | 525/331.1 |
| 4,822,654 A * | 4/1989 | Takemura et al. | 428/36.8 |
| 4,882,394 A * | 11/1989 | Kreiner | 525/332.7 |
| 5,015,668 A * | 5/1991 | Ueda et al. | 525/207 |
| 5,405,918 A * | 4/1995 | Hogt et al. | 525/375 |
| 5,616,279 A * | 4/1997 | D'Sidocky et al. | 525/375 |

FOREIGN PATENT DOCUMENTS

WO    92/05218    9/1990

OTHER PUBLICATIONS

Challenger et al., *Quarterly Reports on Sulfur Chemistry*, "Proceedings of the Third Sulfur Symposium," vol. 5, No. 2 (1970).
Ignatov et al., *Zhurnal Obshchei Khimii* 47(5):1096–1103 (1977).
Jablonowski, *Rubber World*, 206(5):18–22 (1992).
Stolcova et al., "Reversed–phase high–performance liquid chromatographic method for the quantitative determination of alkylbis(20benzothiazolylsulfen)amides," *Journal of Chromatography*, vol. 710, No. 2, Sep. 1, 1995.

* cited by examiner

Primary Examiner—Peter Szekely
(74) Attorney, Agent, or Firm—Daniel Reitenbach; Paul Grandinetti

(57) ABSTRACT

A process is disclosed for preparing an N-hydrocarbyl-bis-benzothiazolesulfenamide comprising reacting an N-hydrocarbyl-2-benzothiazolesulfenamide with a cyclic organic acid anhydride in situ in a polymeric matrix at elevated temperature.

12 Claims, No Drawings

IN SITU PREPARATION OF BIS-(BENZOTHIAZOLESULFEN)AMIDE IN A POLYMERIC MATRIX

BACKGROUND OF THE INVENTION

1. Field of the Invention

The present invention relates to a relatively low cost process for the in situ synthesis of bis-benzothiazolesulfenamide vulcanization accelerators in a polymeric matrix, especially in an elastomer, which is advantageous in that no waste products are produced. The resulting combination can be used for the production of tires and other rubber products without the emission of nitrosamines into the workplace, thereby avoiding environmental and health issues.

2. Description of Related Art

Vulcanization may be defined as a reaction in the presence of heat wherein a chemical additive reacts with an elastomer to change it from a plastic, tacky solid to a thermoset, fixed solid with improved strength and elasticity and increased hardness. The vulcanization reaction is one in which the polymeric rubber molecules are cross-linked by the vulcanizing agent to form a network of macromolecules having less mobility and which have the desired physical properties of a usable rubber product. The type of cross-linking (or vulcanizing) agent will vary with the type of rubber used and the properties desired.

The most commonly used vulcanizing agent is sulfur as it enters into reactions with the majority of the unsaturated rubbers to produce vulcanizates. Sulfur, in the presence of heat, reacts with adjoining olefinic bonds in the polymeric backbone chains or in pendant chains of two elastomeric molecules to form cross-links between the molecular chains.

Vulcanization, as originally known, required long hours and elevated temperatures. Progress was made in speeding the process and improving the properties of the vulcanized product by using accelerators. Reduction in the time required for vulcanization is generally accomplished by changes in the amounts and types of accelerators used.

A type of accelerator used widely with a sulfur vulcanizate system are sulfenamides. Sulfenamides give fast vulcanization (approximately 30 minutes) while providing delayed curing action. Examples of sulfenamide accelerators include N-cyclohexyl-2-benzothiazole sulfenamide (CBS), N-t-butyl-2-benzothiazole sulfenamide (TBBS), N,N-dicyclohexyl-2-benzothiazole sulfenamide (DCBS), N,N-diisopropyl-2-benzothiazole sulfenamide (DIBS), 2-(4-morpholinylthio)-benzothiazole (MBS), 2-(4-morpholinyldithio)-benzothiazole (MBDS), and N-cyclohexyl-bis-benzothiazole sulfenamide (CBBS).

A sulfur acceleration system comprises a vulcanizing agent (e.g., sulfur), a primary accelerator (e.g., a sulfenamide) and, optionally, a secondary accelerator that activates the primary accelerator. Normally, the ratio of primary accelerator to sulfur ranges from 1:4 in a fast curing elastomer (e.g., natural rubber) to approximately 1:2 in a slower curing elastomer (e.g., EPDM).

A typical recipe using a sulfur acceleration system is:

| | |
|---|---|
| SBR | 100.00 |
| ZINC OXIDE | 3.00 |
| STEARIC ACID | 1.00 |
| CARBON BLACK | 50.00 |
| MBT | 1.00 |
| SULFUR | 1.75 |

The thiazoles, characterized by the mercaptobenzothiazoles and their derivatives, are an important and widely used class of accelerators. The discovery of this type of compound dates back to the 1920's, as shown by U.S. Pat. No. 1,544,687, which discloses 2-mercaptobenzothiazole (MBT). This discovery has led to a family of delayed-action accelerators in wide use today.

MBT is formed by reacting aniline with carbon disulfide and sulfur. The derivatives are built up chemically through the mercapto group. By oxidation, it may be changed into the disulfide form. The most important derivatives are the sulfenamides, which have long scorch delays coupled with good cure rates.

The sulfenamides are formed by oxidation of a mixture of MBT and an amine. Alternatively, N-chloroamine can be reacted with the sodium salt of MBT. The sulfenamides in commercial use are generally derived from secondary amines or from primary amines that are somewhat hindered.

When a sulfenamide accelerator is used in the rubber making process, spontaneous oxidation occurs via the reaction of the compound with the $NO_x$ present in ambient air. The formation of nitrosamines must be considered here. Their precursors are found in vulcanization accelerators and to a lesser degree in rubber fillers and additives.

As used throughout this specification, the term "nitrosamines" refers, for example, to N-nitroso-dimethylamine, N-nitroso-diethylamine, N-nitroso-dibutylamine, N-nitroso morpholine, N-nitroso-diisopropylamine, and the like, either collectively or individually.

The N-nitroso compounds are formed by the reaction of a substance containing secondary amino groups and a nitrosating agent derived from the oxides of nitrogen ($NO_x$) or nitrite salts.

Government agencies, such as OSHA and NIOSH in the United States, have been concerned about worker level of exposure to nitrosamines in many industries, including rubber manufacture. The nitrosamines produced by certain sulfenamide accelerators are an undesirable byproduct and there is a desire both by government agencies and the rubber industry to eliminate them.

Another important concern of the rubber vulcanization process is scorch, which may be defined as premature vulcanization. It is considered to be extremely important in defining processability limits (as stated, for example, in Rubber Technology, 3rd Edition, Morton, 1987) and is an additional aspect of the current invention.

Continuous measurement of viscosity at processing temperatures will indicate the time available for further processing. A good stock will have a scorch time slightly longer than the equivalent of the maximum heat it may accumulate during processing.

Of the previously mentioned sulfenamide accelerators in current use, N-cyclohexyl-2-benzothiazole-sulfenamide (CBS) and N-t-butyl-2-benzothiazole-sulfenamide (TBBS) have poor scorch safety. 2-(4-morpholinothio)benzothiazole (MBS) is known to exhibit a level of scorch safety that is very desirable in many rubber compounds. The problem of nitrosamine generation is present, however, using MBS.

WO 92/05218 discloses the use of certain N-alkyl, N-benzyl, N-dibenzyl, or N-cycloalkyl substituted bis(2-benzothiazolesulfen)amides as curing accelerators for rubbery thermosettable polymers in a process of manufacturing rubber articles without generation of N-nitrosamine compounds in the manufacturing environment or article. The articles include tires, belts, hose, and other rubber articles.

It is known from the literature that in the reactions of monosulfenamides with carboxylic anhydrides, bis-sulfenamides are formed (Ignatov et al., *Zhurnal Obshchei Khimii* 47(5):1096–1103 (1977)).

U.S. Pat. No. 3,875,177 discloses a process for the preparation of bis(benzothiazylsulphene)amides of the general formula:

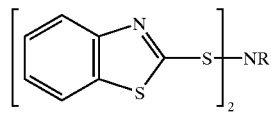

in which the symbol R represents a hydrocarbon radical, by reaction of a benzothiazylsulpheneamide of the general formula:

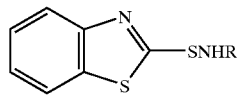

with an organic acid anhydride having a structural formula that includes at least one ring.

In the anhydrides of cyclic formula, a ring can be bonded to the acyl group, for example in aromatic carboxylic acid anhydrides such as benzoic anhydride. The ring can also originate from two carboxyl groups in an intramolecular anhydride, such as anhydrides of aliphatic dicarboxylic acids containing four to six carbon atoms (for example maleic, succinic or glutaric anhydrides). Condensed polycyclic anhydrides can also be used. These are intramolecular anhydrides of aromatic carboxylic acids such as phthalic anhydride and pyromellitic anhydride.

It is preferred that R represent a linear or branched alkyl radical of 1 to 12 carbon atoms or a cycloalkyl radical with 5 to 6 ring carbon atoms such as cyclopentyl or cyclohexyl.

The bis(benzothiazylsulphene)amides obtained by the process of this patent are said to show a high storage stability, make possible high vulcanization speeds with is great safety in use, and impart advantageous mechanical properties to vulcanized products.

Other processes for producing bis(sulfen)amides involve the reaction of a monosulfenamide with HCl gas in a solvent; thus, producing the bis(sulfen)amide and an amine hydrochloride byproduct. In order to separate and isolate the bis(sulfen)amide product, crystallization or evaporation of solvent is necessary. The amine hydrochloride byproduct is then neutralized with a base and recovered or discarded as a caustic stream. If the bis(sulfen)amide is prepared in a solvent by reaction with an acyclic anhydride, as in one aspect of U.S. Pat. No. 3,875,177, the bis(sulfen)amide product must then also be isolated from the solvent solution and separated from the mixture of organic acid and amide byproducts.

U.S. Pat. No. 2,321,305 discloses rubber vulcanization accelerators represented by the general formula

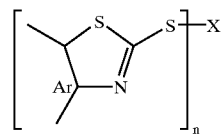

where Ar is an arylene group. When n is 1, X is NH-alkyl, NH-aryl, N-diaryl, O-alkyl, or O-aryl; when n is 2, X is oxygen, NH, N-alkyl, or N-alicyclic; when n is 3, X is N.

Jablonowski (*Rubber World*, 206(5): 18–22 (1992)) describes two chemicals, N,N,N',N'-tetrabenzylthiuramdisulfide (TBzTD) and N-cyclohexyl-bis-(2-benzothiazolesulfen)amide (CBBS), that are said to have the potential to replace several accelerators that generate nitrosamines. The article shows TBzTD replacing thiuram accelerators such as TMTD and TETD, and CBBS, a delayed action sulfenamide, is compared to MBS, DCBS, and other similar accelerators.

SUMMARY OF THE INVENTION

The present invention is directed to a specific method of making bis(benzothiazolesulfen)amides.

More particularly, the present invention is directed to an in situ method of making the class of compounds of the general formula:

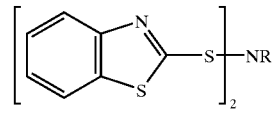

where R is a $C_3$ to $C_9$ branched or linear alkyl, a $C_3$ to $C_9$ cycloalkyl, or a substituted or unsubstituted aryl moiety.

Still more particularly, the present invention is directed to a process for preparing an N-hydrocarbyl-bis-benzothiazolesulfenamide comprising reacting an N-hydrocarbyl-2-benzothiazolesulfenamide with a cyclic organic acid anhydride in situ in a polymeric matrix at elevated temperature.

In a particularly preferred embodiment, the present invention is directed to a process for preparing N-cyclohexyl-bis-benzothiazolesulfenamide comprising reacting an N-cyclohexyl-2-benzothiazolesulfenamide with maleic anhydride in situ in a diene elastomer at a temperature in the range of about 65° C. to about 140° C., wherein the molar ratio of N-cyclohexyl-2-benzothiazolesulfenamide to anhydride is in the range of about 2.25:0.75 to about 2:1.

DESCRIPTION OF THE PREFERRED EMBODIMENTS

According to the present invention, the reaction of an N-hydrocarbyl benzothiazolesulfenamide with an organic acid anhydride can be carried out in the presence of the polymeric substance, i.e., in situ, at elevated temperature to produce the N-hydrocarbyl-bis-benzothiazole sulfenamide accelerator.

As noted above, the N-hydrocarbyl-bis-benzothiazole sulfenamide is of the structure

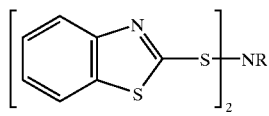

where R is a $C_3$ to $C_9$ branched or linear alkyl, a $C_3$ to $C_9$ cycloalkyl, or a substituted or nonsubstituted aryl moiety.

Where R is a $C_3$ to $C_9$ branched or linear alkyl moiety it can for example, be propyl, butyl, pentyl, hexyl, heptyl, octyl, nonyl, or isomers thereof. Where R is a $C_3$ to $C_9$ cycloalkyl, it can, for example, be cyclopropyl, cyclobutyl, cyclopentyl, cyclohexyl, cycloheptyl, cyclooctyl, or cyclononyl, any of which may be substituted or unsubstituted with any groups that will not significantly adversely affect the functional utility of the accelerator. Bridged cycloalkyl groups may also be employed.

Where R is a substituted or unsubstituted aryl moiety, it is preferably one having from 6 to 10 carbon atoms. Where substituents are present on the aryl group, again, they will be chosen from among those that will not significantly adversely affect the functional utility of the accelerator, for example, alkyl groups, cycloalkyl groups, and aryl groups, among others.

It is preferred that R be cycloalkyl, more preferred that it be cyclohexyl or cyclopentyl, and most preferred that it be cyclohexyl.

The general equation for the chemical reaction that produces the accelerators produced in the practice of the present invention has been given in U.S. Pat. No. 3,875,177:

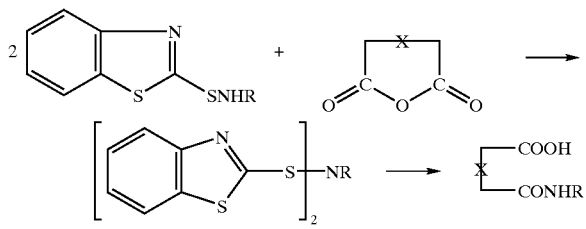

where —CO—X—CO— represents either a diacyl radical or two monovalent cyclic acyl radicals.

The present inventors have discovered that the reaction of an N-hydrocarbyl benzothiazolesulfeneamide with a cyclic organic acid anhydride can successfully be performed in a polymeric matrix at an elevated temperature to produce the bis-(benzothiazolesulfen)amide. Where the hydrocarbyl group is the preferred cyclohexyl moietyl, and the anhydride is maleic anhydride, the reaction can be represented by the following equation:

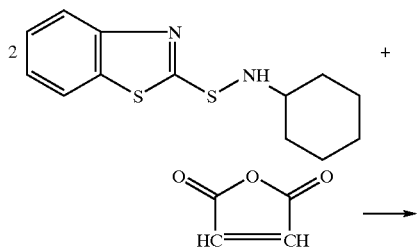

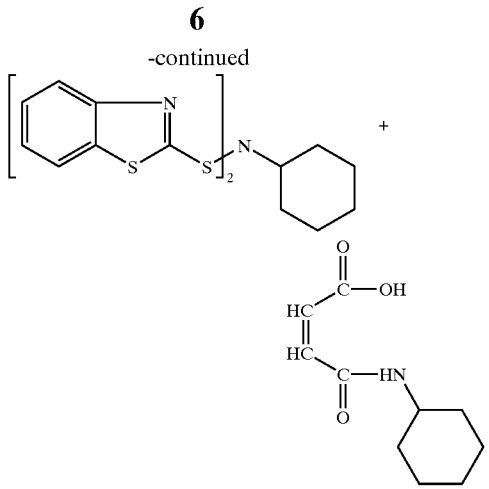

The organic acid anhydrides employed in the practice of the present invention can be those described in U.S. Pat. No. 3,875,177. As stated above, in these organic acid anhydrides, a ring can be bonded to the acyl group, for example, in aromatic carboxylic acid anhydrides, such as benzoic anhydride. Preferably, the ring will originate from two carboxyl groups in an intramolecular anhydride, such as anhydrides of aliphatic dicarboxylic acids containing four to six carbon atoms (for example, maleic, citraconic, succinic, or glutaric anhydrides). Condensed polycyclic anhydrides can also be used. These are intramolecular anhydrides of aromatic carboxylic acids, such as phthalic anhydride and pyromellitic anhydride. The preferred organic acid anhydrides for use in the practice of the present invention are maleic anhydride and citraconic anhydride.

The process of the present invention overcomes the need for isolation steps and eliminates the separate waste streams. All of the reactants are contained in the final product, thereby eliminating the need to recycle solvent or regenerate materials from by-products. The need to handle flammable or otherwise hazardous solvents is also eliminated.

The reaction of the present invention takes place between about 65° C. and about 140° C. and is highly dependent upon mixing temperature and time.

Analytical methods well known to those skilled in the art, e.g., separation by liquid chromatography, can be used to determine the weight percent amounts of N-cyclohexyl-bis-benzothiazolesulfenamide (ESVE), N-cyclohexyl-2-benzothiazolesulfenamide (CBS), and mercaptobenzothiazole (MBTS) (a degradation product of N-cyclohexyl-2-benzothiazolesulfenamide) in the final reaction product.

The compounds employed in the practice of the present invention are most advantageously used as accelerators to cure highly unsaturated polymers, such as natural or synthetic elastomers. Representative of the highly unsaturated polymers that may be produced by the practice of this invention are diene elastomers. Such elastomers will typically possess an iodine number of between about 100 and about 250, although highly unsaturated rubbers having a higher or lower (e.g., of about 50 to 100) iodine number may also be employed. Illustrative of the diene elastomers that may be utilized are polymers based on conjugated dienes, such as 1,3-butadiene; 2-methyl-1,3-butadiene; 1,3-pentadiene; 2,3-dimethyl-1,3-butadiene; and the like, as well as copolymers of such conjugated dienes with monomers, such as styrene, α-methylstyrene, acrylonitrile, methacylonitrile, methyl acrylate, ethyl acrylate, methyl methacrylate, ethyl methacrylate, vinyl acetate, and the like. Preferred highly unsaturated rubbers include natural rubber, cis-polyisoprene, polybutadiene, poly(styrene-butadiene), polychloroprene, and poly(acrylonitrile-butadiene). Moreover, mixtures of two or more highly unsaturated rubbers may be employed. Also, mixtures of the highly unsaturated rubbers with elastomers having lesser unsaturation, such as EPDM, EPR, butyl, or halogenated butyl rubbers, are also contemplated as being within the scope of the present invention.

The second critical cure compound is sulfur, preferably in elemental form, such as the commonly used rhombic crystalline form called "rubber makers" sulfur or "spider" sulfur. It is employed at any suitable level, such as from about 0.25 to about 3.5 parts per hundred of rubber hydrocarbon. It is more preferred that it be below about 2.5, and most preferred that it be below about 2.0 PHR.

The mixing of the composition resulting from the process of the present invention may be accomplished by any suitable means, including an internal mixer, a transfer mixer, an extruder, or an open mill. Independent of the method of mixing the composition, the method of curing may be chosen from the many conventionally known methods, including open steam, autoclave, press or mold curing, liquid salt bath, hot air, microwave, UHF or infrared vulcanization. The method of forming an article into a desired shape is largely dependent upon the mixing and curing method chosen. Some representative methods are mold forming, extrusion, roller head die forming, die cutting, hand lay-up, and, in the case of tires, belts, and hoses, virtually all of these methods are used at some point in the complex method of manufacturing. The forming step can possibly occur after the curing step in such articles as die cut gaskets, rubber bands, and others.

The highly unsaturated polymers to be vulcanized by the products of the process of the present invention may be formulated in conventional manner with the many usual compounding ingredients, in addition to the critical primary accelerator formed in situ in accordance with the practice of the present invention. For example, vulcanizing agents, secondary accelerators, activators (zinc oxide, stearic acid, zinc stearate), tackifiers, processing aids, retarders, antiozonants, antioxidants, plasticizing oils and softeners, particulate fillers, including, but not limited to, reinforcing pigments, talc, clay, silicas, whiting, calcium carbonate, and carbon blacks may be included.

The accelerator-containing products prepared according to the process of the present invention should be added to the unsaturated polymer to be vulcanized at a level such that the formed accelerator will be present in the polymer at a level from about 0.1 to about 5 parts by weight per hundred parts by weight of rubber hydrocarbon (PHR). For these purposes, the polymer is assumed to be one or more natural or synthetic rubbers. A more preferred level is about 0.25 to about 4 PHR. The most preferred level is from is about 0.5 to about 3 PHR. When the accelerator-containing products prepared according to the process of the present invention are used in combination with other non-nitrosamine-forming secondary accelerators, they may be added in a blend that is additive to the ranges set forth above. The accelerator-containing products may be blended such that they will result in a blend with the other secondary accelerators at ratios ranging from about 1:3 to about 3:1. More preferred is a ratio range of about 2:3 to about 3:2. These ratios are meant to indicate the percentages are 40:60 to 60:40, where, in all cases, the in situ formed accelerators of the present invention are the first number of each ratio. It should be noted that in certain applications and with certain other accelerators, the PHR ranges of accelerators listed above may be varied in order to obtain the optimum protection. Reasonable-experimentation may be necessary in order to optimize the ratios and overall levels of the blend when the in situ formed compounds of the present invention are to be blended with other conventional antioxidants and antiozonants.

The in situ formed accelerators of the present invention can be used in elastomeric mixtures in combination with antiozonants used to protect against static attack. The antiozonants that may be utilized include any of the commonly recognized p-phenylenediamine class of materials.

The following sections describe particular rubber articles that are most advantageously produced using the present in situ formed accelerators. In the wide variety of industrial rubber products that will be discussed, many different types of rubbers are utilized encompassing all of those previously disclosed as useful in the practice of the invention. It is to be noted that the present accelerators can be utilized to enhance the cure properties while eliminating the generation of nitrosamines of any polymer system that is being used in any conventional construction of the particular rubber article.

TIRES

The in situ formed accelerators of the present invention can be most advantageously used in a nitrosamine-free tire as a component of any or all of the thermosetting rubber-containing portions of the tire. These components include: the toroidal rubber carcass with a plurality of layers of thermosetting rubber compounds therein and a plurality of layers of reinforcing materials positioned within the carcass;

an overlying tread; sidewall; shoulder; chafer; bead stock; inner liner; and all other elastomeric portions of a truck tire, passenger vehicle tire, or off-road vehicle tire. The components typically contain more than one thermosetting rubber polymer in a blend that must be protected from nitrosamine generation. The non-nitrosamine generating secondary accelerators may also be used in such a tire along with the compounds formed by the process of the present invention.

BELTS

Among the various types of belts manufactured in the rubber industry, the power transmission belts are the types that are most improved using the materials and compounds described herein. The power transmission type generally described as a V-belt, as well as various positive drive and timing type belts, can be greatly improved by using these compositions. Rubber compounds that have been exhaustively described earlier and that contain the in situ formed compounds of the present invention can be most beneficially used on the exterior surfaces of the belt structure. In V-belts, power transmission, and timing belts, they can replace the neoprene in the lower pulley engaging areas of the belt alternatively described as is cushion stock, compression stock, or pulley cover, depending on the belt structure. In order to better understand the utility in power transmission belts, a general description of the belt structure should be useful. The power transmission belt has an elastomeric body that forms the majority of the belt. There is a geometrically defined neutral axis of most belts that pass over a plurality of pulleys. That neutral axis simply indicates that the area above the neutral axis is in tension when going over a pulley, and the area below the neutral axis plane is described as being in compression. Therefore, a typical power transmission belt would have a tension section and a compression section that are separated by the neutral axis plane. The major longitudinal reinforcements are completely conventional in the art and are layers of cords, fabric, or steel cable that lie approximately on the neutral axis plane. The power transmission belt is comprised of one or more rubber compounds having either the same or different polymeric base rubbers. As indicated, the exterior envelope layers of a power transmission belt can be most beneficially enhanced using the rubber compounds that result from the present invention. Also, the compression section that undergoes considerable flexing during the life of a belt can benefit from the enhanced resistance provided by use of the in situ formed accelerators of the present invention and, particularly, when an EPDM rubber is further incorporated with the unsaturated diene-type rubber composition. These areas have conventionally utilized a neoprene (polychloroprene) base rubber that can now be replaced using lower cost, higher oil and solvent resistant polymers, such as NBR and NBR in blends with other polymers, such as SBR, natural rubber, EPDM, etc. Since the rubber composition used in the elastomeric body of the power transmission belt must be capable of embedding within it a plurality of layers of various types of reinforcing materials, adhesion of the rubber stocks to the adjacent layers is absolutely critical to the success of a belt building manufacturing operation. The materials of the present invention permit excellent adhesion levels to be achieved.

CONVEYER BELTING

Conveyer belts are used in a wide variety of environments and carry an extensive variety of payloads. A conveyer belt is generally comprised of an elastomeric body formed of one or more rubber compounds having embedded in the elastomeric body a plurality of reinforcements in a position between an upper cover and a lower cover. It is the cover materials that can most advantageously utilize the rubber compositions using the in situ formed accelerators of the present invention with various synthetic and natural rubbers. Details of specific types of constructions in conveyer belts can be gleaned from Rubber Manufacturing Association (RMA) specifications, which deal with many types and constructions of conveyor belts. Such conventional structure and materials will not be recited here in detail and one of ordinary skill in the art can incorporate the rubber polymers cured with the present accelerators without undue experimentation.

AIR SPRINGS

One of the most difficult applications in the industrial rubber products industry is the fluid spring, commonly called an air spring, which is used either to actuate or vibration dampen a particular mechanical device. Two basic types of air springs are the bellows-type and rolling lobe. A type of rolling lobe called a sleeve type is used in air adjustable shock absorbers for vehicles. The structures differ, but in physical characteristics only, not in function. The materials required are very similar for both rolling lobe and bellows-type air springs. During the useful life of an air spring, it may cycle millions of times during which the internal air pressure will be varied causing deflection of the elastomeric sleeve or diagram of the air spring. A typical air spring is constructed using an upper and a lower retainer, which are rigid structures through which air can be injected or exhausted from a pneumatic working chamber formed by the flexible member that spans the gap between the upper and lower retainers. This fabric reinforced, air impervious membrane is formed into either a straight sleeve or a molded bellows form and air tightly attached to the upper and lower retainers to form the pneumatic working cavity therebetween. The exact structural similarities and differences between rolling lobes and bellows air springs are well known in the art.

HOSE

The vast variety of hose products will not be described at length, except to indicate that the elastomeric components of most hose applications can benefit by utilization of the in situ formed compounds of the invention in at least a portion of the elastomeric body of the hose. A hose, of course, has an outer cover that is resistant to the environment in which the hose operates and an inner tube or liner that resists the particular fluid or material being conveyed within the hose. Between these two layers are positioned a plurality of reinforcement materials, which may be bias laid fabric, woven, or knitted fiber, or filled rubber composite materials. Such hose constructional details will not be reviewed in depth, but incorporation by reference is made to the RMA hose specifications, which deal at length and in depth with the constructional details of the various hose structures. It is the selection and incorporation of materials with which this invention is concerned, and therefore it is sufficient to describe that the conventionally used unsaturated and lesser unsaturation rubbers can be improved in the many ways that have been previously described in this specification.

Many other rubber articles can benefit from the characteristics of the in situ formed accelerators of the present invention. These may include gaskets, bushings, motor mounts, window seals, weatherstripping, bridge bearing pads, rubber roofing membranes, geophysical membranes, such as pond liners, shoe soles and heels, expansion joints, vibration joints, oil field parts, and many other rubber articles.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

Example 1

A quantity of 119.9 grams of Royalene 539 (EPDM) is introduced into, a 100° C. stainless steel prep mixer (307 mL) equipped with cam-style mixing blades. ("Royalene" is the brand name for a family of ethylene-propylene-diene terpolymers commercially available from the Uniroyal Chemical Company. Royalene 539 is an ethylene-propylene-diene terpolymer with an ethylene/propylene weight ratio of 74/26, containing 4.9% ethylidenenorbornene.) 151.9 grams of N-cyclohexyl-2-benzothiazolesulfenamide (CBS) (2 moles) and 28.20 grams of maleic anhydride (1 mole) are charged to this mass and mixed at 40 RPM for 15 minutes. The temperature of the mass initially decreases as the Royalene 539, maleic anhydride (melting point 53° C.), and N-cyclohexyl-2-benzothiazolesulfenamide (melting point 95° C.) are charged. After approximately ten minutes, the reaction approaches completion and forms N-cyclohexyl-bis-benzothiazolesulfenamide (hereinafter designated "ESVE") (melting point approximately 130° C.). The formation of this new, higher melting solid results in greater shear with the mixer and a corresponding increase in reactor temperature. During the last five minutes of mixing, the ESVE created is incorporated into the Royalene 539 matrix. The final crumb-like product comprises ESVE and N-cyclohexylmaleamic acid, a by-product of the reaction. HPLC results are shown below in Table 1. The theoretical maximum yield of ESVE in the above-mentioned product is 40 percent. Values in excess of 40% in the table are believed to result from experimental error. For convenience, the product of Example 1 will hereinafter be referred to as Prodex 1.

Example 2

Example 1 was repeated except that Royalene 505 was substituted for the Royalene 539 employed therein. Royalene 505 is an ethylene-propylene-diene terpolymer with an ethylene/propylene weight ratio of 57/43, containing 8.1% ethylidenenorbornene. HPLC results are shown below in Table 1. For convenience, the product of Example 2 will hereinafter be referred to as Prodex 2.

Example 3

Example 1 was repeated except that Royalene 509 was substituted for the Royalene 539 employed therein. Royalene 509 is an ethylene-propylene-diene terpolymer with an ethylene/propylene weight ratio of 70/30, containing 8.0% is ethylidenenorbornene. HPLC results are shown below in Table 1. For convenience, the product of Example 3 will hereinafter be referred to as Prodex 3.

TABLE 1

HPLC Results for the Products of Examples 1, 2, and 3

| Sample | % CBS | % MBTS | % ESVE |
|---|---|---|---|
| Prodex 1 | 2.0 | 0.9 | 40.4 |
| Prodex 2 | 2.4 | 0.9 | 39.6 |
| Prodex 3 | 1.2 | 1.0 | 40.9 |

Example 4

Prodex 1, Prodex 2, and Prodex 3 are each, individually, extruded through a stainless steel, single screw, four temperature zoned Brabender extruder. All four temperature zones are set to 93° C., and the screw is set to 70 RPM. HPLC analysis is again performed on the cablelike extrusions. The results are shown in Table 2.

TABLE 2

HPLC Results for Extruded Products of Examples 1, 2, and 3

| Sample | % CBS | % MBTS | % ESVE |
|---|---|---|---|
| Prodex 1 | 1.9 | 1.0 | 40.8 |
| Prodex 2 | 2.1 | 0.9 | 39.1 |
| Prodex 3 | 1.1 | 0.9 | 40.5 |

These results show that extrusion of the crumblike products has no detrimental effect on the amounts of N-cyclohexyl-bis-benzothiazolesulfenamide, N-cyclohexyl-2-benzothiazolesulfenamide, or mercaptobenzothiazole in the final product.

Example 5

The following mixing formulation is prepared (composition by parts per hundred rubber):

| | |
|---|---|
| SIR-10 (Natural Rubber from Indonesia) | 100.00 |
| N-220 Black | 55.00 |
| Sundex 790 (aromatic processing oil) | 7.00 |
| Zinc Oxide | 4.00 |
| Stearic Acid | 2.00 |
| Flexzone 7P (N-1,3-dimethylbutyl-N-phenyl-p-phenylenediamine) | 2.50 |
| Sunproof Improved Wax (selected hydrocarbon wax) | 1.00 |
| Tire Sulfur | 2.25 |
| N-cyclohexyl-bis-benzothiazolesulfenamide | See Table 3 |

Comparative vulcanization tests are run and the results are shown in Table 3.

TABLE 3

Results of Comparative Vulcanization Tests

| | Mooney Scorch Time at 132° C. | Rheometer Results at 177° C. | |
|---|---|---|---|
| Sample | $t_3$ (in minutes) | $t_{s2}$ (min.) | $M_H$–$M_L$ (lb-in) |
| Neat ESVE control (1.04 phr) | 14.47 | 1.29 | 29.54 |
| Prodex 1 (2.50 phr) | 13.98 | 1.22 | 32.92 |
| Prodex 2 (2.56 phr) | 13.96 | 1.24 | 32.96 |
| Prodex 3 (2.50 phr) | 13.77 | 1.24 | 32.83 |

These results show that impurities in the final in situ product do not cause any reduction in accelerator activity when compared to the traditional, pure N-cyclohexyl-bis-benzothiazolesulfenamide. The in situ products made in Examples 1, 2, and 3 show substantially the same safety against scorching as the chemically pure product obtained by the neat reaction. Thus, the impurities in the products (i.e., CBS, MBTS, N-cyclohexylmaleamic acid) prepared according to the in situ process of the present invention behave simply as inert diluents.

Example 6

This example shows that substantially the same results as in Example 5 are obtained when synthetic rubber is used in the formulation

| | |
|---|---|
| SBR 1712 (Styrene-Butadiene Rubber) | 82.40 |
| SBR 1500 (Styrene-Butadiene Rubber) | 20.00 |
| Cisdene 1203 (Polybutadiene Rubber) | 20.00 |
| Carbon Black N339 | 85.00 |
| Sundex 790 (aromatic processing oil) | 27.60 |
| Zinc Oxide | 3.00 |
| Stearic Acid | 1.50 |
| Flexzone 7P N-1,3-dimethylbutyl-N-phenyl-p-phenylenediamine) | 1.00 |
| Sunproof Improved Wax (selected hydrocarbon wax) | 0.50 |
| Tire Sulfur | 2.25 |
| N-cyclohexyl-bis-benzothiazolesulfenamide | See Table 4 |

The results of this formulation are shown in Table 4.

TABLE 4

Results Using Synthetic Rubbers

| | Rheometer Results at 177° C. | |
|---|---|---|
| Sample | $t_{s2}$ (min.) | $M_H$–$M_L$ (lb-in) |
| Neat ESVE control (1.04 phr) | 2.76 | 19.15 |
| Prodex 1 (2.50 phr) | 2.65 | 20.39 |
| Prodex 2 (2.56 phr) | 2.67 | 20.28 |
| Prodex 3 (2.50 phr) | 2.69 | 20.10 |

Example 7

Example 1 was repeated except that Royalene 3114 was substituted for the Royalene 539 employed therein. Royalene 3114 is an ethylene-propylene-diene terpolymer with an ethylene/propylene weight ratio of 68/32, containing 9.3% ethylidenenorbornene. HPLC results are shown below in Table 5. For convenience, the product of Example 7 will hereinafter be referred to as Prodex 7.

Example 8

Example 1 was repeated except that Royalene 3362 was substituted for the Royalene 539 employed therein. Royalene 3362 is an oil extended ethylene-propylene-diene terpolymer with an ethylene/propylene weight ratio of 57/43, containing 8.5% ethylidenenorbornene. HPLC results are shown below in Table 5. For convenience, the product of Example 8 will hereinafter be referred to as Prodex 8.

Example 9

Example 1 was repeated except that Royalene 525 was substituted for the Royalene 539 employed therein. Royalene 525 is an ethylene-propylene-diene terpolymer with an ethylene/propylene weight ratio of 57/43, containing 8.5% ethylidenenorbornene. HPLC results are shown below in Table 5. For convenience, the product of Example 9 will hereinafter be referred to as Prodex 9.

Example 10

Example 1 was repeated except that Royalene 535 was substituted for the Royalene 539 employed therein. Royalene 535 is an ethylene-propylene-diene terpolymer with an ethylene/propylene weight ratio of 57/43, containing 9.7% ethylidenenorbornene. HPLC results are shown below in Table 5. For convenience, the product of Example 10 will hereinafter be referred to as Prodex 10.

Example 11

Example 1 was repeated except that Royalene 3962 was substituted for the Royalene 539 employed therein. Royalene 3962 is an oil extended ethylene-propylene-diene terpolymer with an ethylene/propylene weight ratio of 57/43, containing 8.5% ethylidenenorbornene. HPLC results are shown below in Table 5. For convenience, the product of Example 11 will hereinafter be referred to as Prodex 11.

Example 12

Example 1 was repeated except that Royalene 3773 was substituted for the Royalene 539 employed therein. Royalene 3773 is an ethylene-propylenediene terpolymer with an ethylene/propylene weight ratio of 57/43, containing 8.7% ethylidenenorbornene. HPLC results are shown below in Table 5. For convenience, the product of Example 12 will hereinafter be referred to as Prodex 12.

TABLE 5

HPLC Results for the Products of Examples 7 through 12

| Sample | % CBS | % MBTS | % ESVE |
|---|---|---|---|
| Prodex 7 | 4.4 | 1.1 | 39.1 |
| Prodex 8 | 3.9 | 1.0 | 39.0 |
| Prodex 9 | 1.9 | 1.0 | 40.3 |
| Prodex 10 | 3.1 | 1.4 | 37.8 |
| Prodex 11 | 3.9 | 0.8 | 36.6 |
| Prodex 12 | 2.3 | 0.9 | 40.0 |

Example 13

The procedure of Example 1 is repeated replacing the EPDM (Royalene 539) with Paracril Ozo. Paracril Ozo is a blend of an acrylonitrile-butadiene copolymer and polyvinyl chloride, commercially available from the Uniroyal Chemical Company. Results equivalent to those of Example 1 are obtained.

Example 14

The procedure of Example 1 is repeated replacing the EPDM (Royalene 539) with Natsyn 2200. Natsyn 2200 is a brand of synthetic polyisoprene, commercially available from E. I. duPont de Nemours and Company. Results equivalent to those of Example 1 are obtained.

Example 15

The procedure of Example 1 is repeated replacing the EPDM (Royalene 539) with SMR CV5. SMR 5CV is a natural rubber that comes from Malaysia. Results equivalent to those of Example 1 are obtained.

Example 16

The procedure of Example 1 is repeated replacing the EPDM (Royalene 539) with Chlorobutyl (HT) 1066. Chlorobutyl (HT) 1066 is a brand of chlorinated butyl rubber, commercially available from the Exxon Corporation. Results equivalent to those of Example 1 are obtained.

Example 17

The procedure of Example 1 is repeated replacing the EPDM (Royalene 539) with SBR 1712. SBR 1712 is a styrene-butadiene rubber. Results equivalent to those of Example 1 are obtained.

Example 18

The procedure of Example 1 is repeated replacing the EPDM (Royalene 539) with cis-polybutadiene. Results equivalent to those of Example 1 are obtained.

Example 19

The procedure of Example 1 is repeated replacing the EPDM (Royalene 539) with Viton B-50. Viton B-50 is a brand of fluoroelastomer, commercially available from E. I. duPont de Nemours and Company. Results equivalent to those of Example 1 are obtained.

Example 20

The procedure of Example 1 is repeated replacing the EPDM (Royalene-539) with Hydrin H-75. Hydrin H-75 is a brand of epichlorohydrin polymer, commercially available from Zeon Chemicals Inc. Results equivalent to those of Example 1 are obtained.

Example 21

The procedure of Example 1 is repeated replacing the cam-style mixing blades on the Brabender mixer with Sigmga-style blades. The yield of the final product is comparable to that created with the cam-style blade.

Example 22

A quantity of 119.9 grams of Royalene 539 is introduced into a 70° C. stainless steel Brabender prep mixer (307 mL) equipped with cam-style mixing blades. 151.9 Grams of N-cyclohexyl-2-benzothiazolesulfenamide (2 moles) and 28.20 grams of maleic anhydride (1 mole) are charged to this mass and mixed at 40 RPM for 15 minutes. The resulting product is in crumb form and contains 21.7 percent N-cyclohexyl-bis-benzothiazolesulfenamide.

Example 23

A quantity of 119.9 grams of Royalene 539 is introduced into a 65° C. stainless steel Brabender prep mixer (307 mL) equipped with cam-style mixing blades and mixed for five minutes. A quantity of 151.90 grams of N-cyclohexyl-2-benzothiazolesulfenamide (2 moles) is then charged to the same mixer and mixed for three minutes. A quantity of 28.2 grams of maleic anhydride (1 mole) is then charged to this mass and mixed at 55 RPM for 70 minutes. The resulting product is in a dry-crumb comprising 40.5 percent N-cyclohexyl-bis-benzothiazolesulfenamide, 1.9 percent N-cyclohexyl-2-benzothiazolesulfenamide, and 1.1 percent mercaptobenzothiazole.

Example 24

A quantity of 120 grams of Royalene 539 is introduced into a 100° C. stainless steel Brabender prep mixer (307 mL) equipped with cam-style mixing blades. 148.52 grams of N-cyclohexyl-2-benzothiazolesulfenamide (2 moles) and 31.48 grams of citraconic anhydride (1 mole) are charged to this mass and mixed at 40 RPM for 35 minutes. The resulting product is in a wet-crumb comprising 17.7 percent N-cyclohexyl-bis-benzothiazolesulfenamide, 4.5 percent N-cyclohexyl-2-benzothiazolesulfenamide, and 2.8 percent mercaptobenzothiazole.

Example 25

The procedure of Example 1 is repeated replacing the Brabender mixer with a Sigma-blade equipped Jaygo, Inc., AME-5 extruder/mixer. Amounts charged are as follows: 599.5 grams of Royalene 539, 759.5 grams of N-cyclohexyl-2-benzothiazolesulfenamide, and 141 grams of maleic anhydride. The mixing parameters are given in Table 6 and the HPLC results are given in Table 7.

Example 26

The procedure of Example 1 is repeated replacing the Brabender mixer with a Sigma-blade equipped Jaygo, Inc., AME-5 extruder/mixer. Amounts charged are as follows: 599.5 grams of Royalene 539, 759.5 grams of N-cyclohexyl-2-benzothiazolesulfenamide, and 141 grams of maleic anhydride. The mixing parameters are given in Table 6 and the HPLC results are given in Table 7.

Example 27

The procedure of Example 1 is repeated replacing the Brabender mixer with a Sigma-blade equipped Jaygo, Inc., AME-5 extruder/mixer. Amounts charged are as follows: 599.5 grams of Royalene 539, 759.5 grams of N-cyclohexyl-2-benzothiazolesulfenamide, and 141 grams of maleic anhydride. The mixing parameters are given in Table 6 and the HPLC results are given in Table 7.

Example 28

The procedure of Example 1 is repeated replacing the Brabender mixer with a Sigma-blade equipped Jaygo, Inc., AME-5 extruder/mixer. Amounts charged are as follows: 599.5 grams of Royalene 505, 759.5 grams of N-cyclohexyl-2-benzothiazolesulfenamide, and 141 grams of maleic anhydride. The mixing parameters are given in Table 6 and the HPLC results are given in Table 7.

Example 29

The procedure of Example 1 is repeated replacing the Brabender mixer with a Sigma-blade equipped Jaygo, Inc., AME-5 extruder/mixer. Amounts charged are as follows: 599.5 grams of Royalene 539, 759.5 grams of N-cyclohexyl-2-benzothiazolesulfenamide, and 141 grams of maleic anhydride. The mixing parameters are given in Table 6 and the HPLC results are given in Table 7.

TABLE 6

Mixing Parameters for Examples 25–29

| Sample Matrix | Batch Size | Temperature (start-finish) | RPM | Mix Time |
| --- | --- | --- | --- | --- |
| Example 25 | 1500 grams | 70° C.–96° C. | 63 | 45 minutes |
| Example 26 | 1500 grams | 70° C.–119° C. | 84 | 45 minutes |
| Example 27 | 1500 grams | 80° C.–114° C. | 61 | 45 minutes |
| Example 28 | 1500 grams | 80° C.–140° C. | 84 | 30 minutes |
| Example 29 | 1500 grams | 80° C.–115° C. | 61 | 38 minutes |

TABLE 7

HPLC Results for the Products of Examples 25 through 29

| Sample | % CBS | % MBTS | % ESVE |
| --- | --- | --- | --- |
| Example 25 | 3.6 | 1.2 | 26.5 |
| Example 26 | 0.6 | 1.5 | 28.9 |
| Example 27 | 5.8 | 1.4 | 36.3 |
| Example 28 | 1.6 | 1.0 | 26.9 |
| Example 29 | 4.1 | 2.7 | 40.1 |

In view of the many changes and modifications that can be made without departing from principles underlying the invention, reference should be made to the appended claims for an understanding of the scope of the protection to be afforded the invention.

What is claimed is:

1. A process for preparing an N-hydrocarbyl-bis-benzothiazolesulfenamide consisting essentially of reacting a mixture consisting of an N-hydrocarbyl-2-benzothiazolesulfenamide and an anhydride of an aliphatic dicarboxylic acid containing four to six carbon atoms in situ in a natural or synthetic elastomer matrix at elevated temperature, wherein the molar ratio of N-hydrocarbyl-2-benzothiazolesulfenamide to anhydride is in the range of about 2.25:0.75 to about 2:1 and wherein said hydrocarbyl group is $C_3$ to $C_9$ cycloalkyl.

2. The process of claim 1 wherein the matrix is a diene elastomer.

3. The process of claim 2 wherein the diene elastomer possesses an iodine number of between about 50 and about 250.

4. The process of claim 3 wherein the diene elastomer is a conjugated diene or copolymer thereof.

5. The process of claim 1 wherein the elastomer is selected from the group consisting of EPDM, natural rubber, cis-polyisoprene, polybutadiene, poly(styrene-butadiene), polychloroprene, and poly(acrylonitrile-butadiene).

6. The process of claim 1 wherein the N-hydrocarbyl-2-benzothiazolesulfenamide is N-yclohexyl-2-benzothiazolesulfenamide and the N-hydrocarbyl-bis-benzothiazolesulfenamide is N-cyclohexyl-bis-benzothiazolesulfenamide.

7. The process of claim 1 wherein the anhydride is maleic anhydride or citraconic anhydride.

8. The process of claim 1 wherein the reaction is carried out in a batch mixer equipped with cam-style mixing blades, sigma-style mixing blades, or an extruder screw\sigma blade combination.

9. A process for preparing N-cyclohexyl-bis-benzothiazolesulfenamide consisting essentially of reacting a mixture consisting of an N-cyclohexyl-2-benzothiazolesulfenamide and maleic anhydride in situ in a diene elastomer at a temperature in the range of about 65° C. to about 140° C., wherein the molar ratio of N-hydrocarbyl-2-benzothiazolesulfenamide to anhydride is in the range of about 2.25:0.75 to about 2:1.

10. The process of claim 9 wherein the diene elastomer possesses an iodine number of between about 50 and about 250.

11. The process of claim 9 wherein the diene elastomer is EPDM.

12. The process of claim 9 wherein the reaction is carried out in a batch mixer equipped with cam-style mixing blades, sigma-style mixing blades, or an extruder screw\sigma blade combination.

* * * * *